United States Patent
Shveidel et al.

(10) Patent No.: US 12,210,755 B2
(45) Date of Patent: *Jan. 28, 2025

(54) AUTONOMOUS I/O INGESTION AND DATA FLUSHING AMONG NODES IN STORAGE SYSTEMS

(71) Applicant: Dell Products L.P., Round Rock, TX (US)

(72) Inventors: Vladimir Shveidel, Pardes-Hana (IL); Geng Han, Beijing (CN); Yousheng Liu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,283

(22) Filed: Oct. 27, 2023

(65) Prior Publication Data
US 2024/0053907 A1    Feb. 15, 2024

Related U.S. Application Data

(63) Continuation of application No. 17/585,121, filed on Jan. 26, 2022, now Pat. No. 11,836,362.

(51) Int. Cl.
*G06F 12/00* (2006.01)
*G06F 3/06* (2006.01)

(52) U.S. Cl.
CPC .......... *G06F 3/0631* (2013.01); *G06F 3/0611* (2013.01); *G06F 3/0652* (2013.01); *G06F 3/0659* (2013.01); *G06F 3/067* (2013.01)

(58) Field of Classification Search
CPC .... G06F 3/0631; G06F 3/0652; G06F 3/0659; G06F 3/067; G06F 3/0656; G06F 12/0868
See application file for complete search history.

(56) References Cited

U.S. PATENT DOCUMENTS

| | | | |
|---|---|---|---|
| 2021/0117085 A1* | 4/2021 | Vankamamidi | G06F 12/0882 |
| 2021/0216213 A1* | 7/2021 | Shveidel | H04L 67/1001 |
| 2021/0342153 A1* | 11/2021 | Han | G06F 9/5022 |
| 2021/0365206 A1* | 11/2021 | Liu | G06F 3/0644 |

* cited by examiner

*Primary Examiner* — David Yi
*Assistant Examiner* — Tahilba O Puche
(74) *Attorney, Agent, or Firm* — Krishnendu Gupta; Deepika Bhayana; Derek Lam

(57) ABSTRACT

Nodes in a storage system can autonomously ingest I/O requests and flush data to storage. First and second nodes determine a sequence separator, the sequence separator corresponding to an entry in a page descriptor ring that separates two flushing work sets (FWS). The first node receives an input/output (I/O) request and allocates a sequence identification (ID) number to the I/O request. The first node determines a FWS for the I/O request based on the sequence separator and the sequence ID number, and commits the I/O request using the sequence ID number. The I/O request and the sequence ID number are sent to the second node.

20 Claims, 9 Drawing Sheets

AUTONOMOUS I/O INGESTION AND DATA FLUSHING AMONG NODES IN STORAGE SYSTEMS

BACKGROUND

Technical Field

This application relates to autonomous I/O ingestion and data flushing among nodes in storage systems.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks. The storage system may be organized into multiple nodes.

SUMMARY OF THE INVENTION

One aspect of the current technique is a method for nodes in a storage system to autonomously ingest I/O requests and flush data to storage. First and second nodes determine a sequence separator, the sequence separator corresponding to an entry in a page descriptor ring that separates two flushing work sets (FWS). The first node receives an input/output (I/O) request and allocates a sequence identification (ID) number to the I/O request. The first node determines a FWS for the I/O request based on the sequence separator and the sequence ID number, and commits the I/O request using the sequence ID number. The I/O request and the sequence ID number are sent to the second node.

The first node may determine another sequence separator that separates one of the two FWSs from a third FWS by adding a predetermined value to the sequence separator. The second node may determine another sequence separator that separates one of the two FWSs from a third FWS by adding a predetermined value to the sequence separator.

After determining the FWS for the I/O request, the first node may increment a counter for pending I/O requests for the FWS. After committing the I/O request using the sequence ID number, the first node may decrement the counter for pending I/O requests for the FWS. The first node may compare a counter for pending I/O requests for the FWS to zero (0), and flush data associated with the FWS to storage if the counter is equal to 0.

The second node may compare the sequence ID number received from the first node to the sequence separator, and identify an FWS for the I/O request based on the comparison. The second node may determine whether the sequence ID number has been allocated on the second node. If the sequence ID number has not been allocated on the second node, the sequence ID number on the second node may be allocated to the I/O request. If the sequence ID number has been allocated on the second node, the second node may select an unallocated sequence ID number associated with the FWS identified based on the comparison between the sequence ID number and the sequence separator, and allocate the unallocated sequence ID number to the I/O request.

Another aspect of the current technique is a storage system with nodes that autonomously ingest I/O requests. The storage system includes a processor that may be configured to perform any process in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
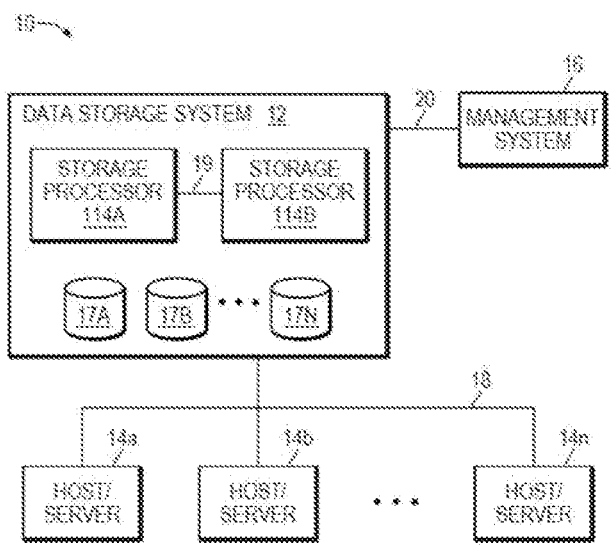
FIG. 1 depicts an example embodiment of a computer system that may be used in connection with performing the techniques described herein.

Described below are techniques for enabling nodes in a storage system to autonomously ingest I/O requests. First and second nodes determine a sequence separator, the sequence separator corresponding to an entry in a page descriptor ring that separates two flushing work sets (FWS). The first node receives an input/output (I/O) request and allocates a sequence identification (ID) number to the I/O request. The first node determines a FWS for the I/O request based on the sequence separator and the sequence ID number, and commits the I/O request using the sequence ID number. The I/O request and the sequence ID number are sent to the second node.

A data storage system can use a page descriptor ring to hold data from I/O requests before the data is flushed to storage. In general, the head is a marker that tracks the last entry in the ring that received data, and as new data is added to the ring, the head is incremented accordingly. To manage data being entered into the ring and data being flushed from the ring to storage, data structures known as flushing work sets (FWS) may be used. Each FWS may be associated with a contiguous set of sequence ID numbers. The data storage system may add data to one FWS until the FWS is filled; during this stage, a FWS that is still receiving data is called a "filling FWS". When all data for the FWS has been logged in the page descriptor ring, such that no more data is expected to be added to the FWS, the data for the FWS is ready to be flushed to storage. During this stage, the FWS is considered "frozen".

Challenges arise when ensuring that multiple nodes associate the data with the correct FWS. To ensure that the FWSs on the nodes mirror one another, one node may serve as the primary node that ensures all other nodes mimic its activities. The primary node may allocate the sequence ID numbers for all the I/O requests, so that all nodes associate the same entries in the page descriptor ring with the same data. The primary node may also determine when a FWS is ready to be frozen and flushed to storage. Consequently, the primary node coordinates with the secondary nodes so that all nodes in the storage system flush the same FWS to storage in parallel with one another.

Under these techniques, before secondary nodes can process the I/O requests they receive, they must transmit the I/O requests to the primary node and wait for sequence ID numbers. Furthermore, because the primary node alone determines how the FWSs are arranged in the page descriptor ring, the secondary nodes must wait for instructions from the primary node to begin flushing data in its page descriptor ring to storage. In this manner, the dependency of the secondary nodes on the primary nodes incurs latency. Thus, enabling the nodes to autonomously ingest I/O requests and flush data to storage would improve system performance.

The techniques described herein reduce interruptions to ingestion of I/O requests while ensuring that the nodes are still assigning I/O requests to the FWSs in a consistent manner. In at least some implementations in accordance with the techniques as described herein, one or more of the following advantages can be provided: improved performance due to uninterrupted processing of I/O requests and autonomous flushing of data to storage.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
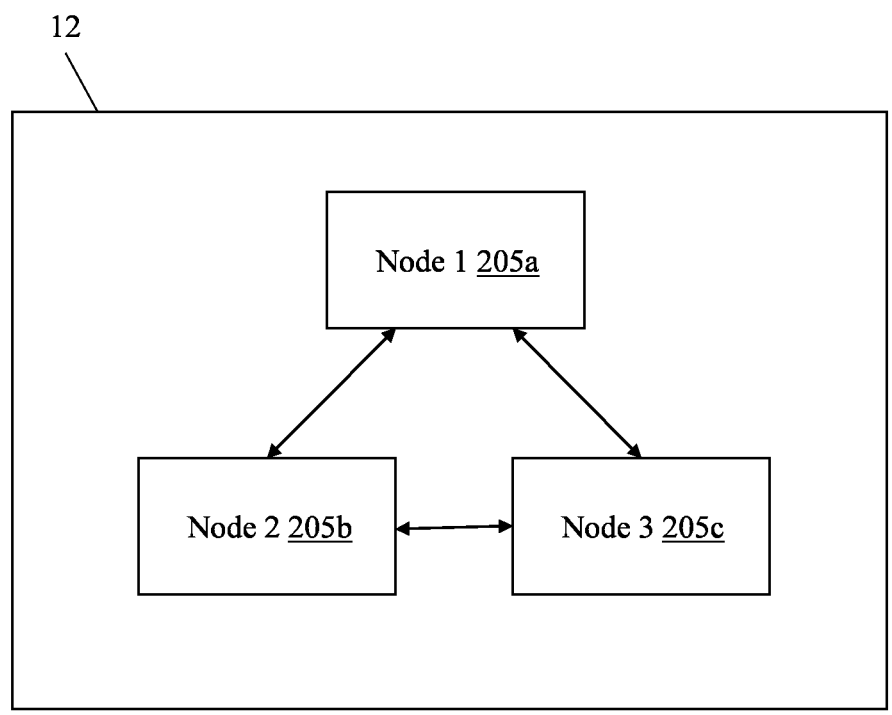
FIG. 2 is a block diagram depicting exemplary nodes among which the elements of the computer system of FIG. 1 may be distributed.

FIG. 2 is a block diagram depicting exemplary nodes 205a, 205b, 205c (individually and collectively, "205") among which the elements of the storage system 12 may be distributed. Although FIG. 2 depicts three nodes 205a, 205b, 205c, various embodiments of the invention may include any number of nodes. The nodes 205 may form a cluster. Each node 205 may receive I/O requests, and communicate with one another to ensure that the data on the nodes 205 are consistent with one another.

Figure 3:
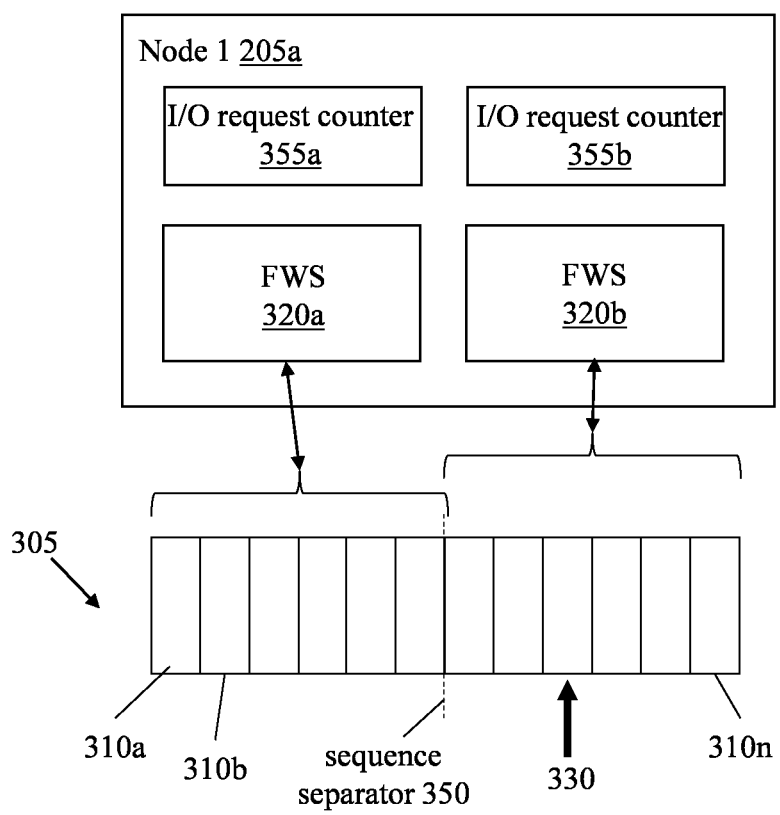
FIG. 3 is a block diagram showing the page descriptor ring, flushing work sets, head, and sequence separator, and counters for pending I/O requests to flushing work sets, on one node.

FIG. 3 is an exemplary diagram showing the page descriptor ring 305 and FWSs 320a, 320b (individually and collectively, "320") on one node 205a, and counters 355a, 355b for pending I/O requests to each FWS 320a, 320b. Other nodes 205b, 205c in the storage system 12 may include the elements described herein.

The page descriptor ring 305 includes multiple entries 310a, 310b, ..., 310n ("310"), each corresponding to a page of data. The head 330 is a marker that points to the next entry 310 available for receiving data. In some embodiments, the head 330 is represented as an offset within the page descriptor ring 305, or a sequence ID number. When the node 205a receives new data to store, the data is stored in the entry 310 corresponding to the head 330 and the head 330 is advanced to the next entry 310. As shown, each FWS 320 corresponds to a different set of entries 310 in the page ring descriptor 305, as identified via a sequence separator 350. If the sequence ID number of an entry 310 is less than a sequence separator 350, the entry 310 pertains to one FWS 320a, and if the sequence ID number is larger, the entry 310 pertains to the next FWS 320b. Although FIG. 3 depicts two FWSs 320a, 320b, other embodiments may have more FWSs 320 collectively spanning the page descriptor ring 305.

Additionally, the node 205a stores counters 355a, 355b to track the number of pending I/O requests associated with the FWSs 320a, 320b. The node 205a may increment a counter 355a, 355b after determining which FWS 320a, 320b an I/O request should be associated with, and decrement the counter after the data from the I/O request has been committed to the appropriate FWS 320a, 320b.

Figure 4:
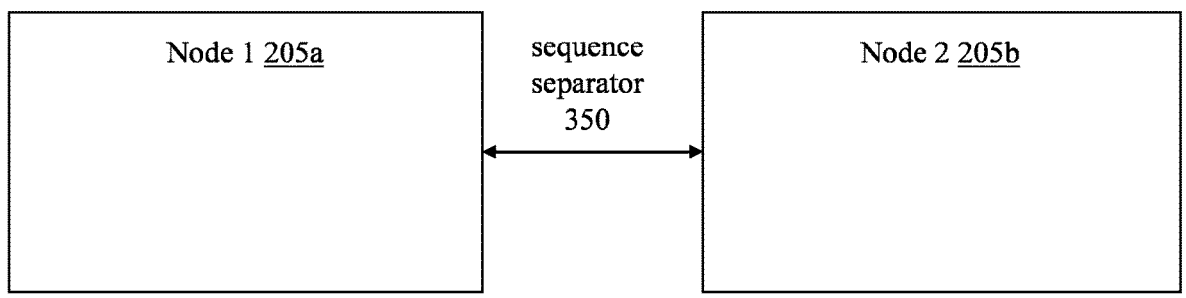
FIG. 4 is a block diagram showing the nodes of the computer system communicating regarding the sequence separator that defines the flushing work sets in the page descriptor ring.

FIG. 4 is a schematic diagram showing the two nodes 205a, 205b coordinating the sequence separator 350 that will separate the FWSs 320a, 320b in each node's respective page descriptor ring 305. In some embodiments, the nodes 205a, 205b set the sequence separator 350 for the FWSs to be a multiple of a pre-defined value, such as 500,000. Thus, a node 205 recognizes a new FWS 320 for every 500,000 pages of data entered into the page descriptor ring 305. The nodes 205a, 205b communicate to establish a first sequence separator 350, and thereafter, each node 205a, 205b continues adding the pre-defined value to the first sequence separator 350 to identify the sequence separator 350 defining the subsequent FWS 320. In this manner, after the initial communication, the nodes 205a, 205b can separately and autonomously identify the sequence separator 350 for subsequent FWSs 320.

The nodes 205a, 205b may use other techniques to determine the next sequence separator 350, so long as both nodes 205a, 205b arrive at the same value. For example, the nodes 205a, 205b may periodically negotiate the next sequence separator 350. Alternatively, the nodes 205a, 205b may negotiate an initial sequence separator 350, and then implement the same technique on each node 205a, 205b to autonomously determine the next sequence separator 305.

While the following steps are described primarily with respect to node 205a, node 205b (or any other node, as would be appreciated by one of ordinary skill in the art) may practice the same steps. A node 205a sets counters 355a, 355b to track the number of pending I/O requests for each FWS 320a, 320b. In some embodiments, an I/O request is pending if its data has not yet been logged in the page descriptor ring 305. As described above, the nodes 205a, 205b may initialize a sequence separator 305 to identify the entry 310 in the page descriptor ring 305 separating one FWS 320a from another FWS 320b. For purposes of this example, entries 310 prior to the sequence separator 305 are associated with FWS 320a, and entries 310 equal to or exceeding the sequence separator 305 are associated with FWS 320b.

When a node 205a receives an I/O request, the node 205a allocates a sequence identification (ID) number to the request. The node 205a compares the sequence ID number to the sequence separator 350. If the sequence ID number is less than the sequence separator 350, the node 205a increments the counter 355a for FWS 320a. Otherwise, the node 205b increments the counter 355b for FWS 320b. The node 205a commits the I/O request to the FWS 320 associated with the allocated sequence ID number, and decrements the counter 355 associated with the FWS 320.

The node 205a communicates the I/O request to peer node 205b, and the communication may include the sequence ID number for the I/O request. The node 205b compares the sequence ID number to the sequence separator 350 to identify the FWS 320a, 320b into which the I/O request shall be entered. In some embodiments, the node 205b determines whether the sequence ID number has already been allocated from its page descriptor ring 305. Because the node 205b also receives I/O requests, the node 205b allocates sequence ID numbers, separately and independently from node 205a. Thus, it is possible that a sequence ID number associated with an I/O request from the node 205a has already been allocated on the node 205b, itself. If the sequence ID number has not yet been allocated, the node 205b allocates the number and associates it with the I/O request from the node 205a.

However, if the sequence ID number has already been allocated to another I/O request, the node 205b compares the sequence ID number to the sequence separator 305 to identify the associated FWS 320. The node 205b identifies a sequence ID number associated with the FWS 320 (i.e., an available sequence ID number either below or above the sequence separator 305, depending on the FWS 320), and allocates it to the I/O request. The node 205b commits the I/O request to the identified FWS 320, logging the data in the entry 310 of the page descriptor ring 305 corresponding to the sequence ID number. The node 205b may confirm to the node 205a that the I/O request has been committed to the FWS 320.

Using these techniques, the nodes 205a, 205b maintain the same data in the FWSs 320a, 320b, 320a', 320b', even though the page descriptor rings 305, 305' may not mirror one another. The sequence separator 350 ensures that when a FWS 320 is flushed to storage, both nodes 205a, 205b flush the same data. Furthermore, because each node 205a, 205b stores the sequence separator 305 and can allocate sequence ID numbers to I/O requests, instead of coordinating with peer nodes 205 to ensure consist sequence ID numbers for all I/O requests, each node 205a, 205b can independently and autonomously commit I/O requests to its FWSs 320a, 320b, 320a', 320b'.

Moreover, each node 205a, 205b can run a background process to monitor the counters 355a, 355b, 355a', 355b' for the FWSs 320a, 320b, 320a', 320b'. When a counter's 355 value drops to zero (0) (and, in some embodiments, remains 0 for a predetermined amount of time), the node 205 infers that the corresponding FWS 320 has been filled and all I/O requests assigned to that FWS 320 have been committed. In other embodiments, the counter 355 is compared to 0 whenever a node 205 finishes committing an I/O request to an FWS 320.

Because no more I/O requests for the FWS 320 are expected, the node 205 considers the FWS 320 to be "frozen" and begins flushing entries 310 in the page descriptor 305 associated with the FWS 320 to storage. Since the values of the locally stored counters 355 determine when flushing begins, the nodes 205a, 205b need not coordinate this process; flushing of the FWSs 320a, 320b, 320a', 320b' can be performed independently and/or in parallel among the nodes 205a, 205b.

Figure 5A:
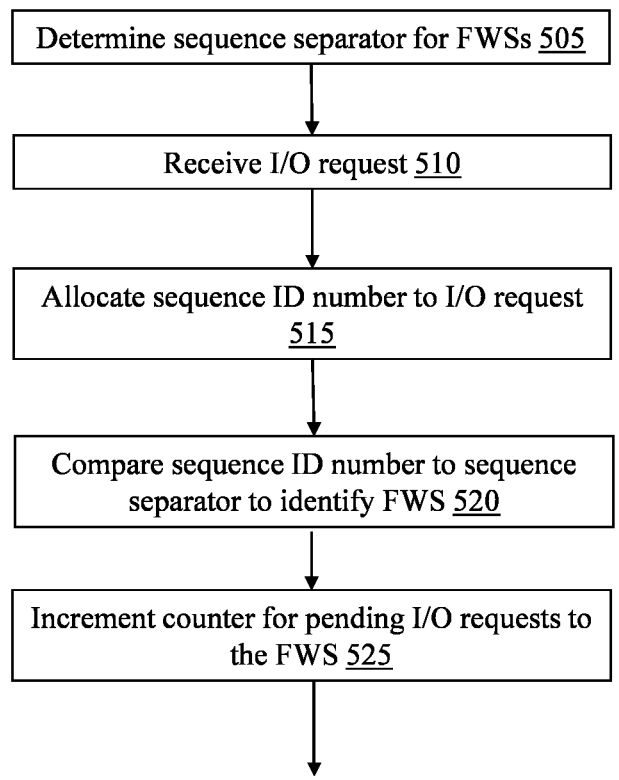
FIGS. 5A-5B is an exemplary flow diagram of a node autonomously ingesting an I/O request received at the node, so as to log the data of the I/O request in the appropriate flushing work set.
Figure 5B:
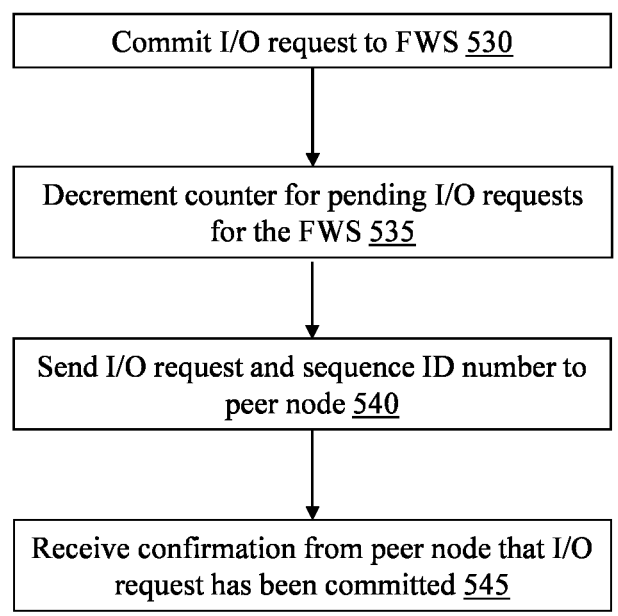

FIGS. 5A-5B is an exemplary flow diagram of a node ingesting I/O requests autonomously. The node 205a and a peer node 205b determine a sequence separator for FWSs 320a, 320b (step 505). The node 205a receives an I/O request (step 510) and allocates a sequence ID number to the request (step 515). The sequence ID number is compared to the sequence separator 305 to identify an FWS 320 for the entry (step 520). The node 205a increments a counter for pending I/O requests to the FWS 320 (step 525). The node 205a commits the I/O request to the FWS (step 530) and decrements the counter for pending I/O requests for the FWS 320 (step 535).

The node 205a sends the I/O request and sequence ID number to the peer node 205b to be committed (step 540). The node 205a receives confirmation from the peer node 205b that the I/O request has been committed (step 545).

Figure 6A:
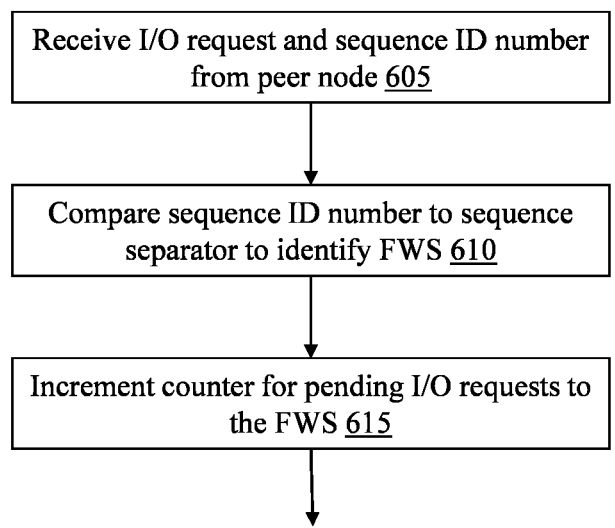
FIGS. 6A-6B is an exemplary flow diagram of a node autonomously ingesting an I/O request transmitted by a peer node, so as to log the data of the I/O request in the appropriate flushing work set.
Figure 6B:
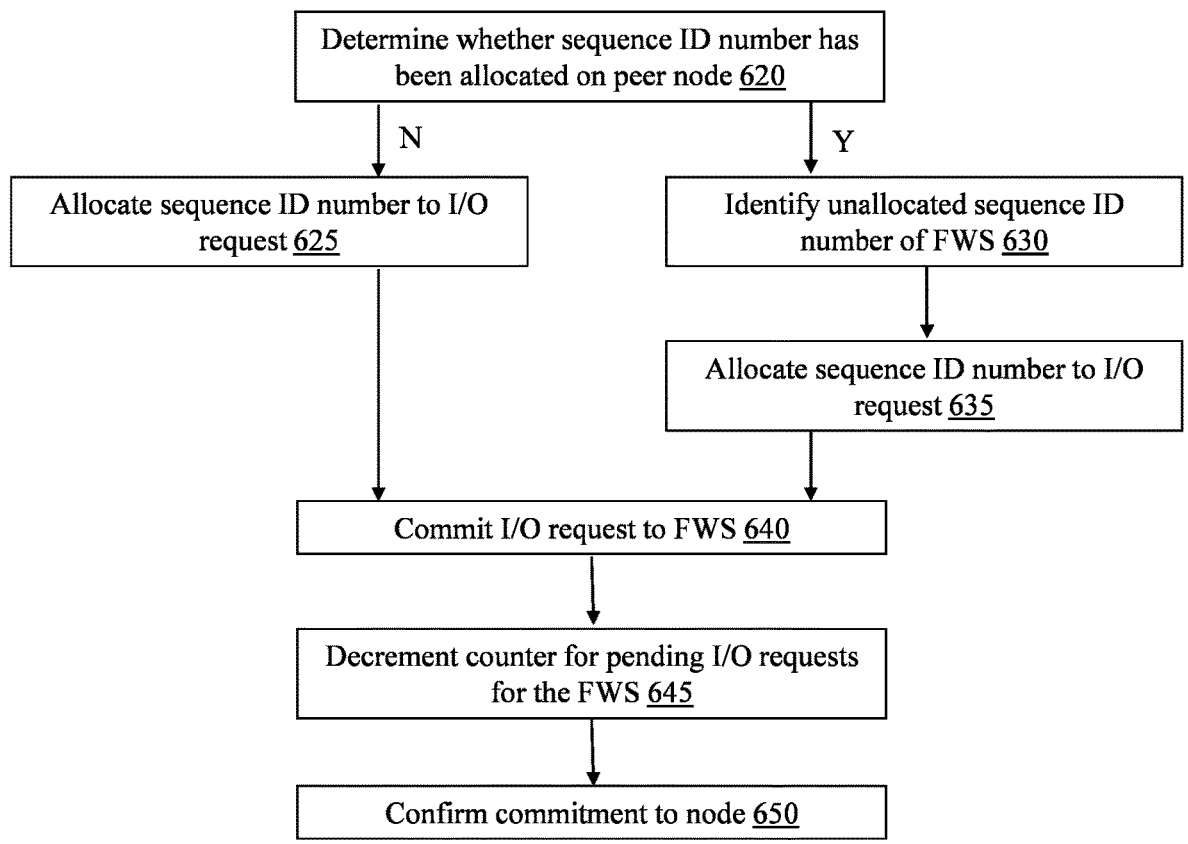

FIG. 6A-6B is an exemplary flow diagram of a node ingesting I/O requests from a peer node. The peer node 205b receives an I/O request and a sequence ID number from a node 205a (step 605). The peer node 205b compares the sequence ID number to the sequence separator 305 to identify a FWS 320 associated with the I/O request (step 610). The peer node 205b increments a counter for pending I/O requests to the FWS 320 (step 615).

The peer node 205b determines if it has already allocated the sequence ID number from the node 205a (step 620). If not, the peer node 205b allocates this sequence ID number to the I/O request (step 625). If so, the peer node 205b identifies an unallocated sequence ID number associated with the FWS 320 (step 630) and allocates that sequence ID number to the I/O request (step 635). The peer node 205b commits the I/O request to the FWS 320 (step 640), and decrements a counter for pending I/O requests to the FWS 320 (step 645). The peer node 205b confirms the commitment to the node 205a (step 650).

Figure 7:
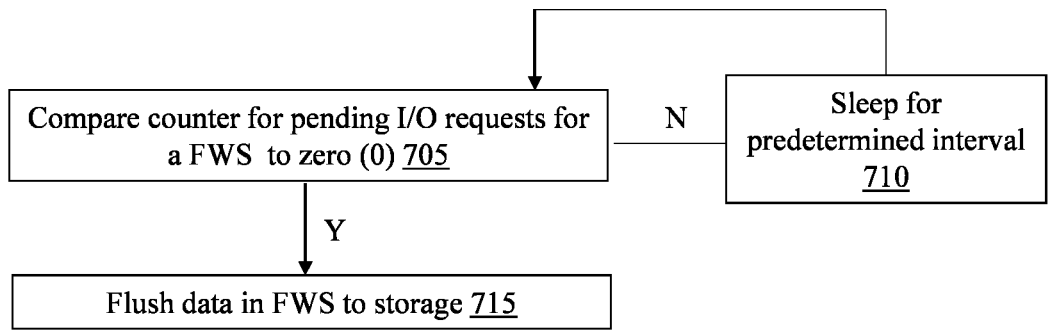
FIG. 7 is an exemplary flow diagram of a node autonomously monitoring a counter for a flushing work set to determine when the data associated with the flushing work set should be flushed to storage.

FIG. 7 is an exemplary flow diagram for a node 205 monitoring a FWS 320. The node 205 compares a counter for pending I/O requests for a FWS 320 to zero (0) (step 705). If the counter is non-zero, then the I/O requests for the FWS 320 have not all been committed yet. The process sleeps for a predetermined interval of time (step 710), before checking the counter again (step 705). In some embodiments, the predetermined interval of time may be of the order of milliseconds, such as 100 ms. If the counter is equal to zero, then all of the I/O requests for a FWS 320 have been committed. In some embodiments, the counter must remain zero (0) for a predetermined amount of time, or a predetermined number of checks, before this conclusion is drawn. Since the FWS 320 is no longer receiving I/O requests, its data can be flushed to storage (step 715).

In some situations, one node 205 may go offline and need to reboot. When the node 205 reboots, the node 205 may communicate with a surviving node regarding the sequence separator 350. The rebooting node 205 may use the sequence separator 350 to reconstruct the FWSs 320. The rebooting node 205 may compare the sequence ID numbers of the I/O requests it obtains from the surviving node 205 to the sequence separator 350, and sort the I/O requests between the FWSs 320 accordingly.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for nodes in a storage system to autonomously ingest I/O requests, the method comprising:
    communicating, by a first node, with a second node to determine a sequence separator, the sequence separator corresponding to an entry in a page descriptor ring that separates two flushing work sets (FWS);
    receiving, by the first node, an input/output (I/O) request;
    allocating, by the first node, a sequence identification (ID) number to the I/O request;
    determining, by the first node, a FWS for the I/O request based on the sequence separator and the sequence ID number;
    committing, by the first node, the I/O request using the sequence ID number; and
    sending, by the first node, the I/O request and the sequence ID number to the second node.

2. The method of claim 1, further comprising:
    causing, by the first node, the second node to determine another sequence separator that separates one of the two FWSs from a third FWS by adding a predetermined value to the sequence separator.

3. The method of claim 1, further comprising:
    causing, by the first node, the second node to compare the sequence ID number received from the first node to the sequence separator; and
    causing, by the first node, the second node to identify an FWS for the I/O request based on the comparison.

4. The method of claim 3, further comprising:
    causing, by the first node, the second node to determine whether the sequence ID number has been allocated on the second node.

5. The method of claim 4, further comprising:
if the sequence ID number has not been allocated on the second node, causing, by the first node, the second node to allocate the sequence ID number on the second node to the I/O request.

6. A storage system with nodes that autonomously ingest I/O requests, the system including a processor configured to:
communicate, by a first node, with a second node to determine a sequence separator, the sequence separator corresponding to an entry in a page descriptor ring that separates two flushing work sets (FWS);
receive, at the first node, an input/output (I/O) request;
allocate, at the first node, a sequence identification (ID) number to the I/O request;
determine, at the first node, a FWS for the I/O request based on the sequence separator and the sequence ID number;
commit, at the first node, the I/O request using the sequence ID number; and
send, by the first node, the I/O request and the sequence ID number to the second node.

7. The storage system of claim 6, the processor further configured to:
cause, by the first node, the second node to determine another sequence separator that separates one of the two FWSs from a third FWS by adding a predetermined value to the sequence separator.

8. The storage system of claim 6, the processor further configured to:
cause, by the first node, the second node to compare the sequence ID number received from the first node to the sequence separator; and
cause, by the first node, the second node to identify an FWS for the I/O request based on the comparison.

9. The storage system of claim 8, the processor further configured to:
cause, by the first node, the second node to determine whether the sequence ID number has been allocated on the second node.

10. The storage system of claim 9, the processor further configured to:
if the sequence ID number has not been allocated on the second node, cause, by the first node, the second node to allocate the sequence ID number on the second node to the I/O request.

11. A non-transitory processor-readable storage medium having stored thereon program code of one or more software programs for nodes in a storage system to autonomously ingest I/O requests, wherein the program code when executed by at least one processing device causes the at least one processing device to perform the following steps:
communicating, by a first node, with a second node to determine a sequence separator, the sequence separator corresponding to an entry in a page descriptor ring that separates two flushing work sets (FWS);
receiving, by the first node, an input/output (I/O) request;
allocating, by the first node, a sequence identification (ID) number to the I/O request;
determining, by the first node, a FWS for the I/O request based on the sequence separator and the sequence ID number;
committing, by the first node, the I/O request using the sequence ID number; and
sending, by the first node, the I/O request and the sequence ID number to the second node.

12. The non-transitory processor-readable storage medium of claim 11, wherein the program code when executed by the at least one processing device causes the at least one processing device to perform the following additional steps:
determining, by the first node, another sequence separator that separates one of the two FWSs from a third FWS by adding a predetermined value to the sequence separator.

13. The non-transitory processor-readable storage medium of claim 12, wherein the program code when executed by at least one processing device causes the at least one processing device to perform the following additional steps:
after committing the I/O request using the sequence ID number, decrementing, by the first node, the counter for pending I/O requests for the FWS.

14. The non-transitory processor-readable storage medium of claim 11, wherein the program code when executed by at least one processing device causes the at least one processing device to perform the following additional steps:
causing, by the first node, the second node to determine another sequence separator that separates one of the two FWSs from a third FWS by adding a predetermined value to the sequence separator.

15. The non-transitory processor-readable storage medium of claim 11, wherein the program code when executed by at least one processing device causes the at least one processing device to perform the following additional steps:
after determining the FWS for the I/O request, incrementing, by the first node, a counter for pending I/O requests for the FWS.

16. The non-transitory processor-readable storage medium of claim 11, wherein the program code when executed by the at least one processing device causes the at least one processing device to perform the following additional steps:
comparing a counter for pending I/O requests for the FWS to zero (0); and
flushing data associated with the FWS to storage if the counter is equal to 0.

17. The non-transitory processor-readable storage medium of claim 11, wherein the program code when executed by the at least one processing device causes the at least one processing device to perform the following additional steps:
causing, by the first node, the second node to compare the sequence ID number received from the first node to the sequence separator; and
causing, by the first node, the second node to identify an FWS for the I/O request based on the comparison.

18. The non-transitory processor-readable storage medium of claim 17, wherein the program code when executed by the at least one processing device causes the at least one processing device to perform the following additional steps:
causing, by the first node, the second node to determine whether the sequence ID number has been allocated on the second node.

19. The non-transitory processor-readable storage medium of claim 18, wherein the program code when executed by at least one processing device causes the at least one processing device to perform the following additional steps:

if the sequence ID number has not been allocated on the second node, causing, by the first node, the second node to allocate the sequence ID number on the second node to the I/O request.

20. The non-transitory processor-readable storage medium of claim 18, wherein the program code when executed by the at least one processing device causes the at least one processing device to perform the following additional steps:
if the sequence ID number has been allocated on the second node,
causing, by the first node, the second node to select an unallocated sequence ID number associated with the FWS identified based on the comparison between the sequence ID number and the sequence separator; and
causing, by the first node, the second node to allocate the unallocated sequence ID number to the I/O request.

* * * * *